(12) United States Patent
Manuel

(10) Patent No.: US 7,376,484 B2
(45) Date of Patent: May 20, 2008

(54) METHOD FOR BUILDING A TOOL

(75) Inventor: Mark Manuel, Shelby Township, MI (US)

(73) Assignee: FloodCooling Technologies, LLC, Bloomfield Hills, MI (US)

( * ) Notice: Subject to any disclaimer, the term of this patent is extended or adjusted under 35 U.S.C. 154(b) by 279 days.

(21) Appl. No.: 11/037,673

(22) Filed: Jan. 18, 2005

(65) Prior Publication Data
US 2006/0161292 A1 Jul. 20, 2006

(51) Int. Cl.
G06F 19/00 (2006.01)

(52) U.S. Cl. .......... 700/206; 700/95; 700/98; 72/478; 29/238

(58) Field of Classification Search .......... 700/206, 700/95, 98, 99; 72/478; 29/421.1, 238, 29/281.3
See application file for complete search history.

(56) References Cited

U.S. PATENT DOCUMENTS

| 1,539,887 | A |   | 6/1925  | Vandergrift |         |
|-----------|---|---|---------|-------------|---------|
| 2,882,766 | A |   | 4/1959  | Towler      |         |
| 3,416,766 | A |   | 12/1968 | Miller      |         |
| 4,141,531 | A |   | 2/1979  | Strausfeld  |         |
| 4,474,722 | A |   | 10/1984 | Martin      |         |
| 4,702,969 | A |   | 10/1987 | Bunkoczy    |         |
| 4,746,055 | A |   | 5/1988  | Ingram      |         |
| 4,810,591 | A |   | 3/1989  | Sakai       |         |
| 4,867,412 | A |   | 9/1989  | Greune      |         |
| 4,946,552 | A |   | 8/1990  | Onnie       |         |
| 4,997,602 | A |   | 3/1991  | Trimble     |         |
| 5,031,483 | A | * | 7/1991  | Weaver      | 76/107.1 |
| 5,032,469 | A |   | 7/1991  | Merz        |         |
| 5,079,102 | A |   | 1/1992  | Tanaka      |         |
| 5,106,290 | A |   | 4/1992  | Carver et al. |       |
| 5,151,167 | A |   | 9/1992  | Truong      |         |
| 5,156,322 | A |   | 10/1992 | Do-Thoi et al. |      |
| 5,247,861 | A |   | 9/1993  | Jahn        |         |
| 5,256,496 | A |   | 10/1993 | Kluczynski  |         |
| 5,273,803 | A |   | 12/1993 | Metcalf     |         |
| 5,330,343 | A |   | 7/1994  | Berteau     |         |

(Continued)

FOREIGN PATENT DOCUMENTS

DE 3711470 A1 10/1988

(Continued)

OTHER PUBLICATIONS

XP-000803370, Walczyk, Nov. 1998.

(Continued)

Primary Examiner—Paul Rodriguez
Assistant Examiner—Nate Laughlin
(74) Attorney, Agent, or Firm—Brooks Kushman P.C.

(57) ABSTRACT

A methodology 40 for producing a laminated tool 10 having desired dimensional accuracy. The tool 10 is produced by the use of several sectional members, such as sectional members 14, 16 which are selectively coupled and which are measured. The measurement is used to determine whether to selectively press these previously coupled sectional members 14, 16 to ensure that their coupled arrangement has a desired dimensional accuracy. Additional measurements and needed pressing operations are accomplished each time a new sectional member is added to the previously coupled sectional member combination.

14 Claims, 2 Drawing Sheets

U.S. PATENT DOCUMENTS

| | | | |
|---|---|---|---|
| 5,345,052 A | 9/1994 | Puddephatt | |
| 5,347,423 A | 9/1994 | deNeuf | |
| 5,377,116 A | 12/1994 | Wayne et al. | |
| 5,399,239 A | 3/1995 | Pai | |
| 5,400,946 A | 3/1995 | Weise et al. | |
| 5,421,544 A | 6/1995 | Roop | |
| 5,439,622 A | 8/1995 | Pennisi et al. | |
| 5,462,263 A | 10/1995 | Feltrin | |
| 5,529,805 A | 6/1996 | Iacovangelo et al. | |
| 5,604,678 A * | 2/1997 | Neuenschwander | 700/206 |
| 5,641,448 A | 6/1997 | Yeung | |
| 5,779,833 A | 7/1998 | Cawley et al. | |
| 5,792,492 A | 8/1998 | Takahashi | |
| 5,793,015 A | 8/1998 | Walczyk | |
| 5,830,585 A | 11/1998 | Hosoe | |
| 5,847,958 A * | 12/1998 | Shaikh et al. | 700/119 |
| 5,869,353 A | 2/1999 | Levy | |
| 5,878,619 A | 3/1999 | Walczak | |
| 5,948,548 A | 9/1999 | Welty | |
| 6,024,851 A | 2/2000 | Radhakrishnan | |
| 6,025,036 A | 2/2000 | McGill | |
| 6,038,525 A | 3/2000 | Maguire | |
| 6,060,392 A | 5/2000 | Essaian | |
| 6,063,436 A | 5/2000 | Pavell | |
| 6,081,328 A | 6/2000 | Eng | |
| 6,090,207 A | 7/2000 | Knauss | |
| 6,090,507 A | 7/2000 | Grenon | |
| 6,103,402 A | 8/2000 | Marcin, Jr. | |
| 6,109,332 A | 8/2000 | Sachs | |
| 6,113,752 A | 9/2000 | Hollstein | |
| H1933 H | 1/2001 | Zabinski | |
| 6,355,331 B2 | 3/2002 | Hillier | |
| 6,391,473 B2 | 5/2002 | Numakura | |
| 6,401,001 B1 | 6/2002 | Jang et al. | |
| 6,472,029 B1 | 10/2002 | Skszek | |
| 6,495,272 B1 | 12/2002 | Creber et al. | |
| 6,587,742 B2 * | 7/2003 | Manuel et al. | 700/98 |
| 6,627,835 B1 | 9/2003 | Chung | |
| 2002/0175265 A1 | 11/2002 | Bak et al. | |
| 2004/0128016 A1 | 7/2004 | Stewart | |
| 2004/0156947 A1 * | 8/2004 | Hada et al. | 425/810 |
| 2005/0127567 A1 * | 6/2005 | DAvies | 264/322 |

FOREIGN PATENT DOCUMENTS

| | | |
|---|---|---|
| EP | 0 775 550 A1 | 5/1997 |
| EP | 1216 806 A2 | 6/2002 |
| GB | 38370/73 | 8/1973 |
| JP | 58-091123 | 5/1983 |
| WO | WO 8707538 | 12/1987 |
| WO | WO 88/07932 | 10/1988 |
| WO | WO 95/08416 | 3/1995 |
| WO | WO9508416 | 3/1995 |
| WO | WO 01/70450 A1 | 9/2001 |
| WO | WO 03/043795 | 5/2003 |

OTHER PUBLICATIONS

A New Rapid Tooling Method For Sheet Metal Forming Dies—D. Walczyk.

International Preliminary Report for corresponding PCT/US2005/045954, mailed Aug. 2, 2007, 9 pages.

* cited by examiner

METHOD FOR BUILDING A TOOL

FIELD OF THE INVENTION

The present invention generally relates to a method for building a tool, and more particularly to a method for building a laminated tool having a relatively high degree of overall dimensional accuracy.

BACKGROUND OF THE INVENTION

A tool has traditionally been created or formed from a substantially solid object. Particularly, the substantially solid object is burned, cut, or otherwise configured to form the tool. It should be appreciated, at the outset, that the term "tool" is meant to broadly refer to any object or tangible entity which is used to selectively create another tangible entity or item. Further, the term "tool", as used in this description, should not be narrowly construed to refer to any particular type of tool, but should remain broadly defined.

While the foregoing traditional approach does allow a tool to be selectively created, it suffers from some drawbacks. By way of example and without limitation, the foregoing strategy requires a relatively large amount of time and effort and is relatively costly. Further, the created tool is not easily modified.

To overcome these and other drawbacks associated with this traditional tool building technique and strategy, an approach has been developed in which a soft design (e.g., a design based upon or created within software) of the tool is initially created. The soft design is then used to create various intangible or "soft" sections and these sections are respectively, typically, and sequentially manifested into respective physical sections which are sequentially coupled to build the tool. Such an approach is often referred to as a "lamination" approach and is described within U.S. Pat. No. 6,587,742 ("The '742 Patent"), which was issued on Jul. 1, 2003, which was assigned to Applicant's assignee, and which is fully and completely incorporated herein by reference, word for word and paragraph for paragraph.

While this "lamination" strategy does reliably produce a tool which overcomes the foregoing drawbacks of prior tool forming strategies, sometimes the produced tool fails to have a desired overall dimensional accuracy. That is, various spatial dimensions of the produced tool may not always be as close to the spatial dimensions of the softly designed tool as is desired, and such differences may arise from spatial variations associated with the structure and/or surface contours or the individual sectional members. That is, a produced sectional member may have surface features, contours, or other spatial dimensions which are not quite equal to or similar to the surface features, contours, and spatial dimensions of the corresponding "soft" or intangible sectional member. Such differences may arise from the technique used to produce the sectional member or just from seemingly minor surface or other structural imperfections associated with the physical sectional member. Accordingly, as the number of selectively coupled sectional members increases, these individual variations accumulate and may cause a rather undesirable overall variation between the actually produced physical tool and the corresponding "soft" design.

One approach to address this issue involves the measurement of the spatial dimensions of each produced sectional member and the use of these measurements, in feedback fashion, to "fix" or set the location within the "soft" design which specifies the characteristics of the next produced sectional member. This "feedback" approach is described with The '742 Patent.

While the foregoing approach does increase the overall dimensional accuracy of the produced tool, yet another approach to overcoming the foregoing difficulties may be utilized and this competing approach is described within this Application. Further, it should be appreciated that the following described approach may be used in combination with the "feedback" approach which is described with The '742 Patent to produce a tool having even greater overall dimensional accuracy.

SUMMARY OF THE INVENTION

It is a first non-limiting object of the present invention to provide a method for producing a tool which overcomes some or all of the foregoing drawbacks associated with a lamination tool creation strategy.

It is a second non-limiting embodiment of the present invention to provide a method for producing a tool which overcomes some or all of the foregoing drawbacks associated with a lamination tool creation strategy and which, by way of example and without limitation, may be used in combination with existing "feedback" type strategies to produce a tool having superior overall dimensional accuracy.

According to a first non-limiting aspect of the present invention, a method for building a tool is provided. Particularly, the method includes the steps of forming an intangible model of the tool; using the intangible model to create first and second physical sectional members; using the intangible model of the tool to determine a desired thickness of the combination of the first and second physical sectional members; coupling the first physical sectional member to the second physical sectional member, thereby forming the combination; and pressing one of the first and second sectional members against a second of the first and second sectional members until the desired thickness is achieved.

According to a second non-limiting aspect of the invention, a method for building a tool is provided and includes the steps of determining a desired thickness; forming a first sectional member having a first thickness which is less than the desired thickness; forming a second sectional member having a second thickness which is less than the desired thickness; coupling the first sectional member to the second sectional member; pressing the first sectional member against the second sectional member while measuring the thickness of the coupled members; and terminating the pressing operation only when the thickness of the coupled members is substantially similar to the desired thickness.

According to a third non-limiting aspect of the invention, a method for building a tool having a desired thickness is provided. Particularly, the method includes the steps forming a plurality of sectional members, wherein each of the formed plurality of sectional members each have a substantially identical and respective thickness; coupling a first of the sectional members to a second of the sectional members, thereby forming a first object; measuring the thickness of the first object; pressing the first object, effective to cause the first object to have a predetermined thickness; growing the first object by sequentially attaching each of the remaining plurality of sectional members to the first object while pressing the first object after each such sequential attachment in order to ensure that each such sequential attachment respectively causes the thickness of the first object to be respectively equal to a unique predetermined value.

These and other features, aspects, and advantages of the present invention will become apparent from a reading of the following detailed description of the preferred embodiment of the invention, including the subjoined claims and by reference to the following drawings.

DETAILED DESCRIPTION OF THE PREFERRED EMBODIMENT OF THE INVENTION

Figure 1:
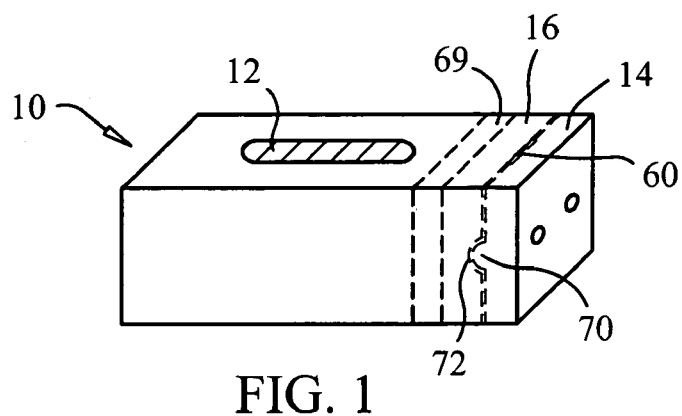
FIG. 1 is a perspective view of a laminated tool which is made in accordance with the teachings of the preferred embodiment of the invention.

Referring now to FIG. 1, there is shown a tool 10 which is made in accordance with the teachings of the preferred embodiment of the invention. Particularly, the tool 10 may be used to produce any sort of desired object or tangible item, by the use of the forming surface 12.

Preferably, the tool 10 includes several sectional members, such as sectional members 14, 16 which are physically produced by the use of a "soft" model, such as that described within The '742 Patent, and then coupled in order to allow these sectional members, such as sectional members 14, 16 to cooperatively form the tool 10. Particularly, a pair of sectional members, such as sectional member 14, 16, are selectively coupled to form a "pre-tool" (e.g., a tool which is "under construction") and additional needed sectional members are then sequentially produced and selectively coupled to the formed "pre tool", in order to "grow" this "pre tool" into the tool which is shown in FIG. 1. Sometimes, however, the tool 10 may be formed by only two sectional members, such as sectional members 12, 14.

Figure 4:
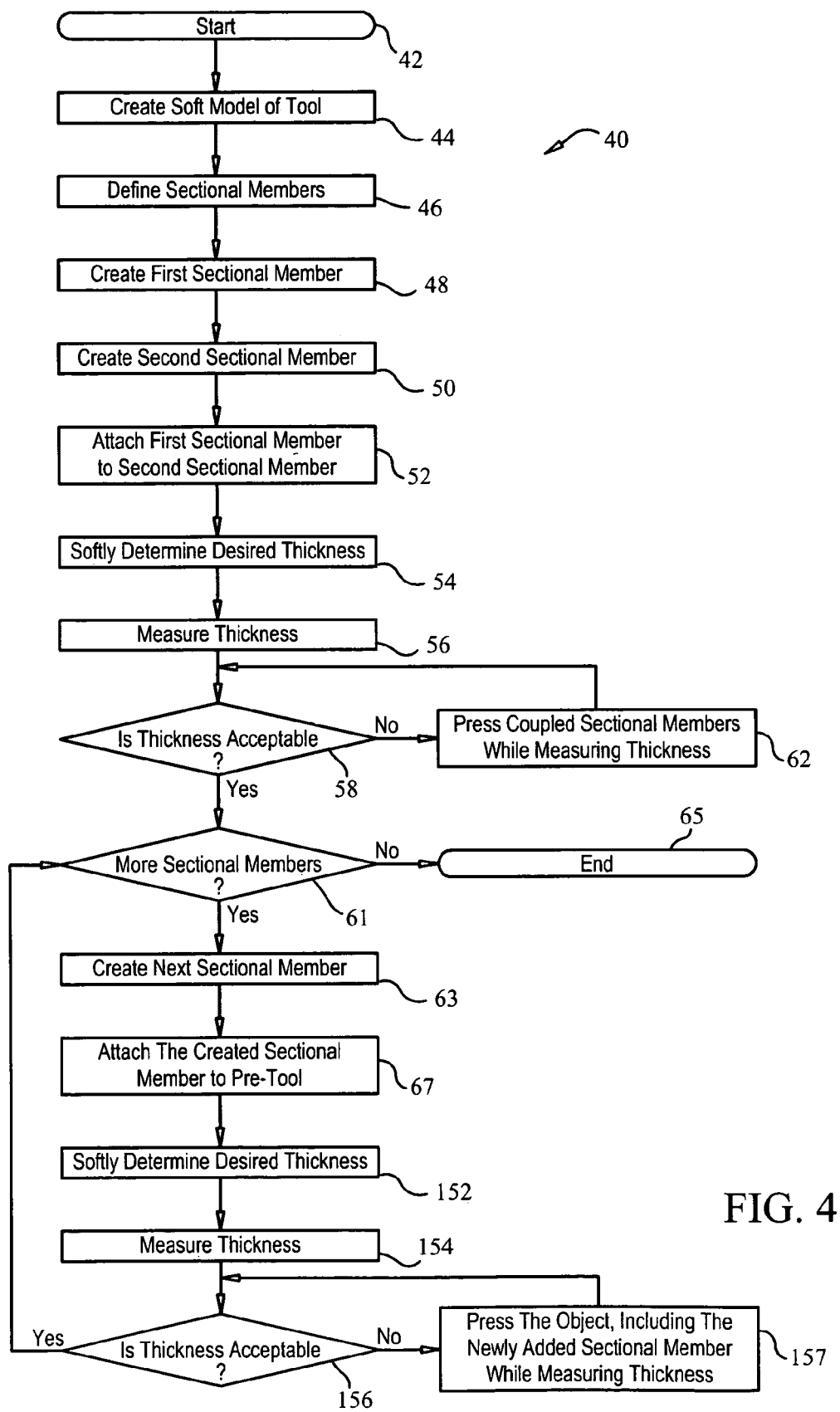
FIG. 4 is a flowchart illustrating a sequence of steps which collectively and cooperative define the tool creation methodology of the preferred embodiment of the invention.

Referring now to FIG. 4 there is shown a flowchart or methodology 40 which includes a sequence of steps which cooperatively form the methodology of the preferred embodiment of the invention.

Particularly, the methodology 40 begins with an initial step 42 which defines or delineates the beginning of the overall process and in which it is acknowledged that tool 10 is to be built.

Step 42 is followed by step 44 in which a model or design of the overall tool 10 is created by the use of software and therefore represents a "soft" model. A further description of the creation and use of such a "soft" model is included within The '742 Patent. Step 44 is followed by step 46 in which the various sectional members, such as sectional members 12, 14, are defined or delineated within this "soft model", each having a respective and "predetermined" thickness and other required spatial characteristics. Such sectional member delineation is further described within The '742 Patent.

Step 46 is followed by step 48 in which a first of the softly delineated sectional members (i.e., sectional member 14) is physically created in accordance with its corresponding soft design. Step 50 follows step 48 and, in this step 50, the second sectional member, (i.e., sectional member 16) is created in accordance with its soft design. Step 52 follows step 50 and, in this step 52, the first sectional member 14 is physically attached to the second sectional member 16. Such attachment may be made by placing a bonding agent or material, such as bonding agent or material 60, between these sectional members 14, 16 and/or by the use of a complementary surface feature arrangement.

Figure 2:
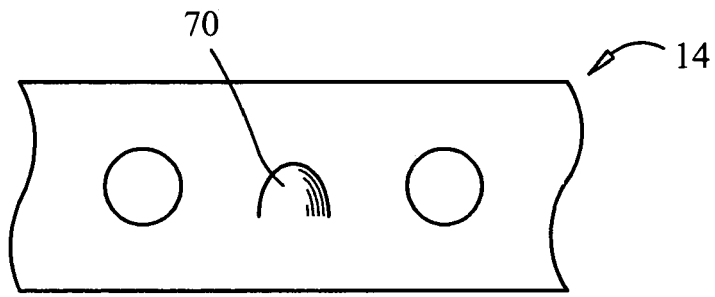
FIG. 2 is a partial side view of a sectional member, shown in FIG. 1, and made in accordance with the teachings of the preferred embodiment of the invention.

That is, in some non-limiting embodiments of the invention, adjacently attached sectional members, such as sectional members 14, 16, respectively includes surface features which are complementary (i.e., one of the surface features is adapted to selectively and fittingly be nestled within or couple to the second surface feature). For example, as shown in FIGS. 1 and 2, a first of the sectional members, such as sectional member 14, might include at least one surface protuberance or "bump" 70 and the sectional member to which the sectional member 14 is coupled (i.e., sectional member 16) might include a depression 72 which is substantially similar in size to the protuberance 70 and which is adapted to selectively and frictionally receive the protuberance 70, thereby allowing the sectional members 14, 16 to be selectively coupled and actively enhancing the connection of the sectional members 14, 16. If a sectional member, such as sectional member 14 is physically located between two other sectional members, then that sectional member normally includes two complementary surface features (e.g., either feature 70, 72) on each abutting surface and each complementary surface feature respectively couples to another unique feature one another member. Further, several such features, such as features 70, 72, may be respectively utilized on each surface. In one embodiment, the sectional members, such as sectional members 14, 16, may receive material 60 before being physically coupled.

Step 52 is followed by step 54 in which the total thickness of the two coupled sectional members (e.g., sectional members 12, 14) is softly determined (i.e., determined by use of the "soft" design). That is, the respective thickness, in the model, of each intangible section is recognized or obtained. Step 56 follows and requires the actual physical thickness of the two coupled sections, 14, 16 to be measured.

Figure 3:
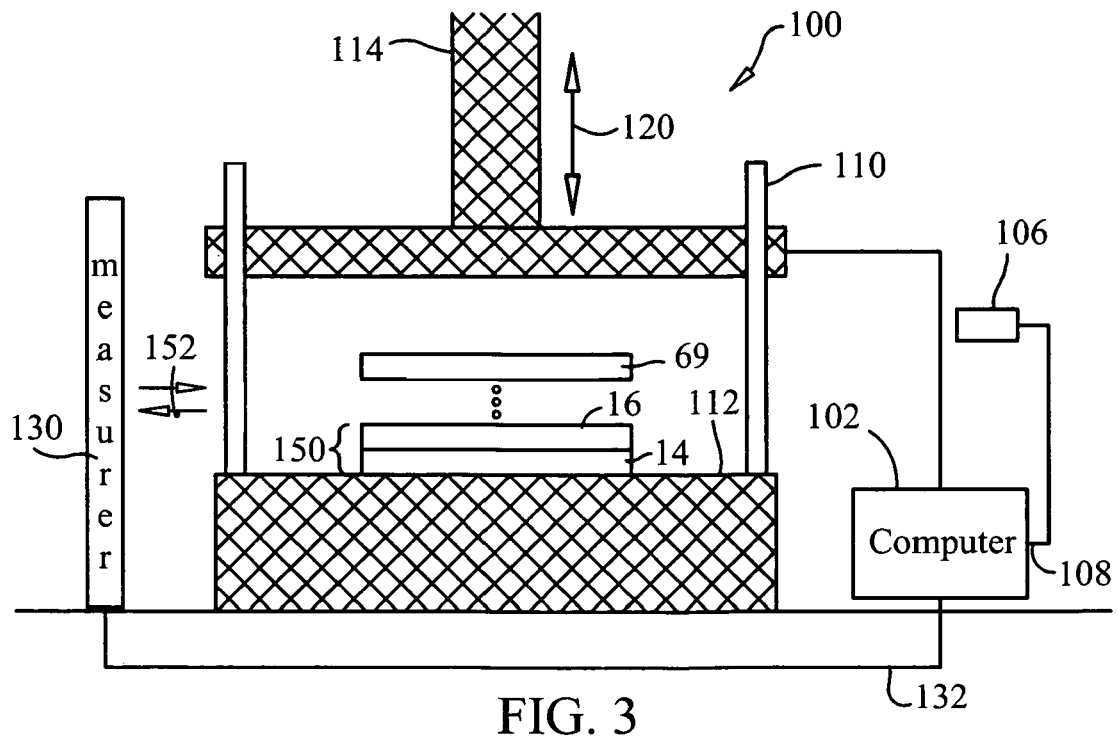
FIG. 3 is a partial side view of a press assembly being utilized with several sectional members to form the laminated tool which is shown in FIG. 1.

To understand the manner in which the thickness may be measured in step 56, reference is now made to the press assembly 100 which is shown in FIG. 3. Particularly, the press assembly 100 includes a computer or controller 102 which is operable under stored program control, which is operatively coupled to a source of electrical power 106 by the use of bus 108, and which may comprise the very same computer assembly which is used by the invention to create and utilize the "soft model" of the tool 10 (e.g., the computer or controller 102 may correspond to the assembly 12 of The '742 Patent"). Further, the assembly 100 includes a press 110 having a table or placement portion 112 upon which objects or tangible items to be selectively pressed are deposited, a movable ram assembly 114 which is adapted to be selectively moved in an axial direction 120 toward and away from the portion 112, and a measurement assembly 130 which is physically and communicatively coupled to the controller 102 by the use of bus 132. In one non-limiting embodiment of the invention the measurement assembly 130 comprises a commercially available laser thickness measurement assembly. Any other thickness measurement assembly may be used.

In step 56, the coupled sectional members 14, 16 are placed upon the table portion 112 and the measurement assembly 130 "reads" or determines the thickness 150 (e.g., by the use of generated and subsequently reflected light signals 152) and reports this determined thickness to the controller assembly 102, by the use of bus 132.

Step 58 follows step 56 and, in this step 58, the controller assembly 102 compares the "read" thickness to the "softly" required thickness, found or determined in step 54, and if the two thickness values are substantially similar (e.g. are equal or differ only by an acceptable amount), then step 58 is followed by step 61. Alternatively, step 58 is followed by step 62 in which the controller assembly 102 causes the ram assembly 114 (e.g., by sourcing electrical power to it from source 106), to forcibly engage the coupled sections 14, 16, thereby pressing them together, while receiving thickness data from the measurement assembly 130. Step 62 may be followed by step 58 (or they may be accomplished concurrently). In each case, the pressing operation continues until the measured physical thickness is acceptable and such a determination is made in step 58, or until it is determined, by the operator, that such pressing will not ever allow the measured thickness to come within the desired range.

In step 61, the controller 102 determines whether any more sectional members are needed to construct the tool 10 by reviewing the previously constructed "soft model". If no more sectional members are needed, step 61 is followed by step 65 in which the overall methodology 40 is ended. Alternatively, step 61 is followed by step 63 in which the next sectional member, according to the "soft model", is physically constructed. Step 63 is followed by step 67 in which the next sectional member (e.g., sectional member 69) is attached to sectional member 16, thereby "growing" the "pre tool" tangible object which had been formed by the coupling of sectional member 14 to sectional member 16. Such a selective attachment may be made by the use of bonding material 60 and/or complementary surface features, (e.g., features 70, 72) which are respectively resident upon respective abutting surfaces of the sectional members 16,69.

Step 67 is followed by step 152 in which the thickness of this new pre-tool object (e.g., the combination of sectional members 14, 16, and 69) is determined by the software model. Step 154 follows step 152 and, in this step 154, the thickness of this new pre tool combination is measured by the measurement assembly 130 and communicated to the controller 152 by the use of bus 132. Step 154 is followed by step 156 in which the controller 102 compares the recently received thickness measurement value to the "softly determined" thickness value, associated with the combination of sectional members 14, 16, and 69 and determines whether the two measurements are equal or differ from acceptable value. If the measured thickness of this new pre tool is acceptable, then step 156 is followed by step 61.

Alternatively, step 156 is followed by step 157 in which this new pre tool object is selectively pressed, by the ram assembly 114, and the thickness measured and communicated to the controller 102, by the bus 132. The pressing is completed when the thickness is made to equal the "softly" determined thickness or it is within an acceptable value, or when it is determined that such a pressing operation will not allow the thickness of the new pre tool assembly to be acceptable. Step 157 therefore is followed by step 156, when the determined thickness of this new pre tool assembly becomes acceptable. At any time, during the methodology 40, if it is determined by the operator that further pressing will not allow the pressed item or pre tool to have a desired thickness, the methodology 40 is stopped and the entire tool creation process begun again with entirely new sectional members, or some other remedial action is accomplished. In one non-limiting embodiment, the thickness of each sectional member is made substantially equal to a predetermined value.

It is to be understood that the inventions are not limited to the exact construction and methodology which has been delineated above, but that various changes and modifications may be made without departing from the spirit and the scope of the inventions as they are further delineated in the following claims.

In one alternate embodiment, the thickness of each sectional member, such as sectional members 14, 16, 69 cannot exceed a certain predetermined value in order to reduce tolerance inaccuracies (i.e., the thickness of a sectional member magnifies the tolerance inaccuracy associated with that member and in a non-limiting embodiment, the actual measured "final" thickness measurements (i.e., the actual accepted and "physical" measurements) are sequentially "fed back" or communicated to the tool model and are used in the manner set forth in the '752 patent to ensure that the process 102 is substantially always made aware of the location, within the model, that each of the pre-tool physically produced objects/sectional members reside, thereby allowing the model derived or predetermined thickness values to be highly accurate since a thickness value may be calculated, for the next sectional member, at the exact place in the model which the pre-tool object respectively and then currently resides. It should be appreciated that bonding material 60 not only couples the various sectional members, such as members 14, 16, but also concurrently "fills in" any gaps between the joined sectional members. Such gaps may be formed due to the tolerance variances between/within/ upon the various sectional members, such as sectional members 14, 16. Further, any and all of the sectional members, such as members 14, 16, may be formed prior to the assembly of tool 10. In yet another alternate embodiment, the thickness of each created sectional member is made to be substantially equal to a predetermined value.

What is claimed is:

1. A method for building a tool having a desired thickness, said method comprising the steps forming a plurality of sectional members, wherein each of said formed plurality of sectional members each have a substantially identical and respective thickness; coupling a first of said sectional members to a second of said sectional members, thereby forming a first object; measuring the thickness of said first object; pressing said first object, effective to cause said first object to have a predetermined thickness; growing said first object by sequentially attaching each of said remaining plurality of sectional members to said first object while pressing said first object after each such sequential attachment in order to ensure that each such sequential attachment respectively causes the thickness of said first object to be respectively equal to a unique predetermined value.

2. The method of claim 1 wherein each of said plurality of sectional members are formed from a substantially identical material.

3. The method of claim 2 wherein said substantially identical material comprises steel.

4. The method of claim 2 wherein said substantially identical material comprises aluminum.

5. The method of claim 2 wherein said substantially identical material comprises a composite material.

6. The method of claim 2 wherein said step of coupling said first sectional member to said second sectional member comprises the step of placing a bonding material between said first and second sectional members.

7. The method of claim 2 wherein said step of coupling said first sectional member to said second sectional member comprises the step of forming a first surface feature within said first sectional member; forming a second surface feature within said second sectional member; and causing said first surface feature to be fixed within said second surface feature, thereby coupling said first sectional member to said second sectional member.

8. The method of claim 2 further comprising the steps of fixing a certain maximum thickness; and ensuring that the respective thickness of each of the sectional members does not exceed said maximum thickness value.

9. A method for building a tool comprising the steps of:
forming an intangible model of the tool; using said intangible model to create first and second physical sectional members;
using said intangible model of said tool to determine a desired thickness of the combination of said first and second physical sectional members;
coupling said first physical sectional member to said second physical sectional member, thereby forming said combination;
pressing one of said first and second sectional members against a second of said first and second sectional members until said desired thickness is achieved;
using said intangible model to create a third sectional member;
using said intangible model of said tool to determine a desired thickness of the combination of said first, second and third physical sectional members;
coupling said third physical sectional member to one of said first and second physical sectional members, thereby forming said combination; and
pressing said third sectional member against one of said first and second sectional members until said desired thickness is achieved.

10. The method of claim 9 wherein the third physical sectional member is coupled to one of said first and second physical sectional members after one of said first and second sectional members are pressed against a second of said first and second sectional members.

11. A method for building a tool comprising the steps of:
determining a desired thickness;
forming a first sectional member having a first thickness which is less than said desired thickness;
forming a second sectional member having a second thickness which is less than said desired thickness;
coupling said first sectional member to said second sectional member;
pressing said first sectional member against said second sectional member while measuring the thickness of said coupled members;
terminating said pressing operation only when said thickness of said coupled members is substantially similar to said desired thickness;
determining a second desired thickness;
forming a third sectional member having a third thickness which is less than said second desired thickness;
coupling said third sectional member to one of said first and second sectional members;
pressing said third sectional member against one of said first and second sectional members while measuring the thickness of said coupled members; and
terminating said pressing operation only when said thickness of said coupled members is substantially similar to said second desired thickness.

12. The method of claim 11 wherein the third sectional member is coupled to one of said first and second sectional members after said first sectional member is pressed against said second sectional member.

13. A method for building a tool comprising the steps of:
creating an intangible model of said tool, wherein said intangible model of said tool includes at least two intangible sections each respectively having a predetermined thickness;
physically creating each of said at least two intangible sections;
adding said predetermined thickness of said intangible section to said predetermined thickness of said second intangible section in order to form a thickness value;
attaching a first of said at least two physically created sections to a second of said at least two physically created sections;
pressing together said attached at least two physically created sections until the thickness of the combination of said at least two physically created sections is substantially equal to said predetermined thickness value;
wherein said intangible model of said tool includes at least three intangible sections each respectively having a predetermined thickness,
physically creating a third of said at least three intangible sections;
adding said predetermined thickness of said third intangible section to said predetermined thickness value in order to form a second thickness value;
attaching said third physically created section to one of said first and second physically created sections; and
pressing together said attached at least three physically created sections until the thickness of said at least two physically created sections is substantially equal to said second predetermined thickness value.

14. The method of claim 13 wherein said third physically created section is attached to one of said first and second physically created sections after said attached at least two physically created sections are pressed together.

* * * * *